J. Essex,
Making Shoe Pegs.
No. 281. Patented July 17, 1837.
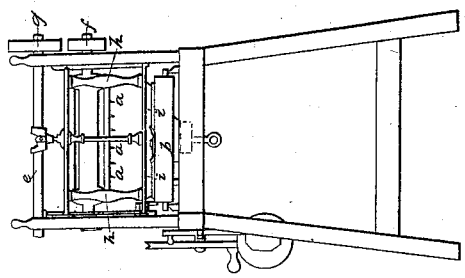
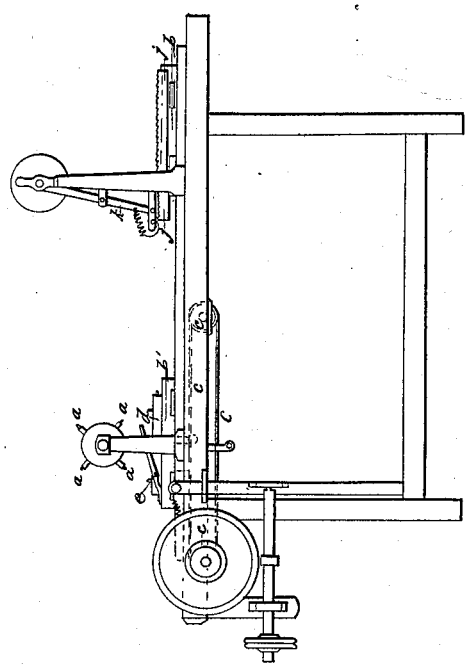

UNITED STATES PATENT OFFICE.

JOSEPH ESSEX, OF KILLINGLY, CONNECTICUT.

IMPROVEMENT IN MACHINES FOR POINTING AND CUTTING WOODEN PEGS FOR PEGGING BOOTS AND SHOES.

Specification forming part of Letters Patent No. 281, dated July 17, 1837.

*To all whom it may concern:*

Be it known that I, JOSEPH ESSEX, of Killingly, in the county of Windham and State of Connecticut, have invented an Improved Apparatus or Machinery for Pointing and Cutting Wooden Shoe-Pegs for Pegging Boots and Shoes; and I do hereby declare that the following is a full and exact description thereof.

By means of my machinery the blocks, after they have been sawed and dressed to the proper thickness for the length of a peg, are first scored in two directions, so that the pegs when cut shall be sharp-pointed and afterward split in two directions so as to complete them. The pointing is effected by means of revolving cutters $a\ a$, which are fixed upon strips sustained like the rounds of a reel by means of arms projecting from a revolving shaft. I usually employ eight such strips, setting the cutting-teeth upon them in such a way as that upon each strip they shall be eight times the distance apart of the diameter of the smallest peg to be made, the whole, collectively, standing like a spiral line around a cylinder. When pegs of double this diameter are to be pointed, one-half of the strips may be removed, and the strips are also made adjustable by means of set-screws for the purpose of adapting them to all the sizes, that can be required. The cutters fixed into these strips are triangular, one of the flat sides, of course, being presented to the block to be cut. They may be affixed to the strips by screw-nuts or otherwise. The shaft $a'\ a'$ of this cutting apparatus crosses the frame of the machine horizontally, its gudgeons running in suitable bearings.

The block to be pointed is placed upon a platform $b\ b'$, standing horizontally under the cutters and sliding upon tongues or guide-pieces projecting above the shears or side pieces of the frame, there being grooves or check-pieces adapting it thereto. This platform may be made to advance by means of a band and whirl $c\ c\ c$ or otherwise. It is made in two thicknesses, the upper part $d$ being circular and capable of revolving upon a center pin on the lower portion, and of being affixed in any desired position on the lower by pins passing through both or by a clamp against its side. The block to be pointed may be held upon the platform by points projecting up from the latter, a slight blow or pressure rendering them sufficiently firm. By turning a winch, or by any proper gearing, the platform is caused to pass under the revolving cutters which turn toward the block. The platform is then turned one-quarter round or in any other required degree, and again passed under the cutters, which completes the pointing. A second platform $d$ receives the block, which has been thus scored for the purpose of dividing it into pegs. This platform slides on the same shears or side pieces with the former, and the block is affixed upon it by a clamp bearing against its edges. A knife $i\ i$, sufficiently long to reach across the largest stuff to be split, is attached to the lower side of a sliding frame $h\ h$, which works up and down between slides or fender-posts like a saw-gate, there being a crank-shaft $l$ crossing from slide to slide above the frame or gate with a pitman for operating the gate. The knife descends so far only as is necessary to split the pegs without actually separating them.

To feed the block under the knife, I attach a toothed rack $j\ j$ to one side of the platform, the teeth being of such size as may be required for the pegs to be made and being removable for the purpose of substituting others. Upon one end of the crank-shaft I place a cam, which acts upon the upper end of a vertical feed-arm $k$, or lever, the fulcrum of which is upon one of the fender-posts, and upon the lower end of this lever there is a pawl or pawls, which take into the rack upon the platform.

The bands or gearing need no description, as they can be differently arranged in ways familiar to every machinist. This second platform may sometimes be used in one thickness, but I intend in general to construct it with a second revolving platform constructed and operating in the manner of that described as constituting a part of the first.

Having thus fully described the construction and the operation of my said machine, I do hereby declare that I do not claim the scoring or the pointing of pegs by means of revolving cutters; but I do claim—

1. The manner of constructing and arranging the revolving cutting apparatus having the cutters upon adjustable strips, in the manner and for the purpose herein set forth.

2. The double platform, the upper portion revolving upon the lower in the manner described, the whole constructed substantially in the way herein set forth.

JOSEPH ESSEX.

Witnesses:
THOS. P. JONES,
JOSEPH H. TUCK.